United States Patent
Sandhu et al.

(10) Patent No.: US 7,039,412 B2
(45) Date of Patent: May 2, 2006

(54) METHOD AND APPARATUS FOR TRANSMITTING WIRELESS SIGNALS ON MULTIPLE FREQUENCY CHANNELS IN A FREQUENCY AGILE NETWORK

(75) Inventors: Sumeet Sandhu, San Jose, CA (US); Qinghua Li, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 253 days.

(21) Appl. No.: 10/744,318

(22) Filed: Dec. 22, 2003

(65) Prior Publication Data

US 2005/0136933 A1  Jun. 23, 2005

Related U.S. Application Data

(60) Provisional application No. 60/493,937, filed on Aug. 8, 2003.

(51) Int. Cl.
*H04Q 7/20* (2006.01)
*H04Q 5/22* (2006.01)
*H04B 7/216* (2006.01)

(52) U.S. Cl. ............... 455/445; 455/450; 370/335; 370/342; 340/10.1

(58) Field of Classification Search ......... 455/450, 455/445, 41.1; 370/335, 316, 206, 342; 375/146, 375/316, 132
See application file for complete search history.

(56) References Cited

U.S. PATENT DOCUMENTS 5,771,229 A * 6/1998 Gavrilovich ............ 370/342
5,781,583 A * 7/1998 Bruckert et al. ............ 375/146
6,298,035 B1 * 10/2001 Heiskala ...................... 370/206
6,745,008 B1 * 6/2004 Carrender et al. ......... 455/41.1
6,754,195 B1 * 6/2004 Webster et al. ............. 370/335
2002/0071478 A1 * 6/2002 Cornwall et al. ........... 375/132
2003/0012302 A1 * 1/2003 Webster et al. ............. 375/316
2004/0070490 A1 * 4/2004 Taki et al. ................. 340/10.1
2004/0110508 A1 * 6/2004 Haartsen ..................... 455/445

FOREIGN PATENT DOCUMENTS

WO  WO-03005652 A1  1/2003
WO  WO-05018180 A1  2/2005

OTHER PUBLICATIONS

Dornan, A., "Lesson 181: IEEE 802.11a And 802.11g Wireless LANs", *Network Magazine*, 18, (Aug., 2003),20-21.

Kuo, W. -., et al., "Enhanced Backoff Scheme in CSMA/CA for IEEE 802.11", *Proceedings of the SPIE, vol. 5100, Digital Wireless Communications, V*, Rao, R. M., et al., (eds.),(Apr. 21, 2003),92-103.

(Continued)

*Primary Examiner*—William Trost
*Assistant Examiner*—Kiet Doan
(74) *Attorney, Agent, or Firm*—The Law Offices of John C. Scott, LLC

(57) ABSTRACT

A mixed data unit for use in a wireless network may include a first portion having information that is coded over a single frequency channel and a second portion having information that is coded across multiple frequency channels. In at least one embodiment, the first portion includes duration related information that may be used by legacy client devices within the network to determine a duration for which the legacy device is to remain quiet to avoid packet collisions in the network.

56 Claims, 7 Drawing Sheets

OTHER PUBLICATIONS

Rosdahl, J. , *IEEE P802.11 Wireless LANs—Criteria for Standards Development*, Obained from http://grouper.ieee.org/groups/802/11, Document No. IEEE 802.11-02/799r6, (Mar. 5, 2003),4 p.

Shoemake, M. B., "Performance Enhancements to the IEEE 802.11B Standard", *Proceedings of the International Conference on Wireless LANs and Home Networks*, (Dec. 5, 2001),100-109.

\* cited by examiner

US 7,039,412 B2

METHOD AND APPARATUS FOR TRANSMITTING WIRELESS SIGNALS ON MULTIPLE FREQUENCY CHANNELS IN A FREQUENCY AGILE NETWORK

The present application claims the benefit of U.S. Provisional Application No. 60/493,937, filed Aug. 8, 2003.

FIELD OF THE INVENTION

The invention relates generally to wireless communications and, more particularly, to signaling schemes for use in wireless systems.

BACKGROUND OF THE INVENTION

Many current wireless networking technologies select a single frequency channel, from a number of supported channels, for use by an access point within a particular cell or service set. All client devices within the cell or service set then communicate with the access point using the selected channel. High throughput (HT) wireless networking technologies are now being proposed that would allow a number of different frequency channels to be used within a particular service set. In addition, these HT technologies may also permit multiple frequency channels to be teamed together within a service set to service a particular client device at a higher overall data rate. One such technology, for example, is currently being considered by the IEEE 802.11 task group n. Once established, such HT wireless networking technologies will have to, at least temporarily, co-exist with the single channel, legacy technologies. Methods and structures may therefore be needed to facilitate the co-existence of these technologies.

DETAILED DESCRIPTION

Figure 1:
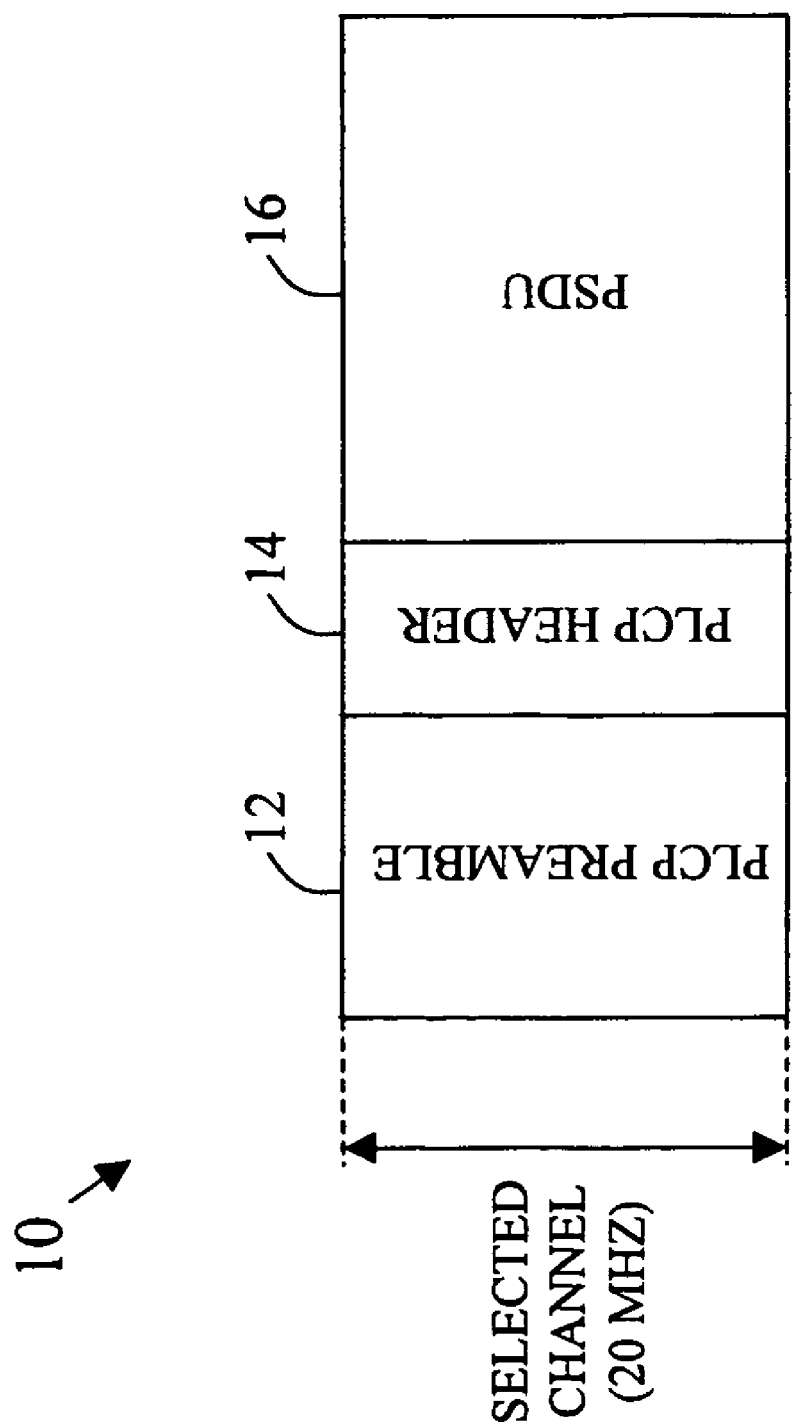
FIG. 1 is a diagram illustrating a physical layer convergence protocol (PLCP) protocol data unit (PPDU) that may be used to support data communication within a wireless network.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 is a diagram illustrating a physical layer convergence protocol (PLCP) protocol data unit (PPDU) 10 that may be used to facilitate data communication within a wireless network following the IEEE 802.11 a wireless networking standard (IEEE Std 802.11a-1999). As illustrated, the PPDU 10 includes: a PLCP preamble 12, a PLCP header 14, and a PLCP service data unit (PSDU) 16. The PPDU 10 may be wirelessly transmitted from either an access point or a client device (i.e., a "station" or "STA" in IEEE 802.11 terminology) within a wireless network. As shown, the PPDU 10 is transmitted within a single 20 MegaHertz (MHz) channel that is selected for a basic service set (BSS) from a plurality of supported channels. The PSDU 16 is the medium access control (MAC) layer payload that is to be wirelessly transmitted within the physical (PHY) layer. The contents of the PSDU 16 will determine the type of packet that the PPDU 10 represents (e.g., a data packet, an acknowledge (ACK) packet, a request-to-send (RTS) packet, a clear-to-send (CTS) packet, etc.). The PSDU 16 may include information identifying the length of the entire packet exchange that is currently taking place at the MAC layer (e.g., an RTS/CTS exchange, a DATA/ACK exchange, etc.). The PLCP preamble 12 and the PLCP header 14 are added at the PHY layer to facilitate transmission of the PSDU 16 via the physical (wireless) medium. The PLCP preamble 12 includes training information that allows a receiver to synchronize to the corresponding transmitting device upon reception. The PLCP header 14 may include, among other things, rate information indicating a data rate associated with the PSDU 16, length information indicating a number of data elements within the PSDU 16 that are to be transmitted, and parity information. The rate information may also be indicative of a modulation type that is used within the PSDU 16.

The IEEE 802.11a wireless networking standard specifies the use of carrier sense multiple access with collision avoidance (CSMA-CA) to control access to a wireless channel. Thus, before transmitting on a channel, a wireless device will first "listen" to the channel to determine whether any other devices are currently transmitting. This may allow the wireless device to avoid the creation of collisions within the wireless medium. A mechanism known as clear channel assessment (CCA) has been developed to manage the listening process. Using CCA, a wireless device will monitor the wireless channel. When a PPDU 10 (see FIG. 1) is transmitted on the channel, the wireless device will sense the PPDU 10, synchronize to the transmitting device during the PLCP preamble 12 of the PPDU 10, read the length and rate information (among other things) during the PLCP header 14 of the PPDU 10, and then read the contents of the PSDU 16. The PSDU 16 will indicate to the wireless device whether the PPDU 10 was intended for delivery to the wireless device. The PSDU 16 will also indicate the type of packet that the PPDU 10 is and the duration of the current MAC layer packet exchange. After the wireless device reads the PSDU 16, it will set a MAC layer network allocation vector (NAV) and thereafter remain quiet (i.e., not transmit) for the duration of the on-air packet exchange. By remaining quiet in this manner, the wireless device can avoid the creation of collisions on the wireless medium.

In some cases, a wireless device will not be able to read the PSDU 16 of a sensed packet. This may occur, for example, when the wireless device does not support the data rate used in the PSDU 16. In such a case, the wireless device may use the rate and length information within the PLCP header 14 to predict the duration of the PPDU 10. The wireless device may then set its PHY layer NAV to the predicted duration value and remain quiet for this duration.

As described above, high throughput (HT) wireless networking technologies are now being proposed that would allow a plurality of different frequency channels to be used within a particular service set. For example, in one possible implementation, four 20 MHz channels centered at 5220 MHz, 5240 MHz, 5260 MHz, and 5280 MHZ could be active within a basic service set. Many other multi-channel scenarios are also possible. Wireless devices within such a service set (e.g., client devices, access points, etc.) would be able to communicate using any of the active channels. In addition, two or more of the active frequency channels could be teamed together to permit communication at a higher data rate within the service set. For example, the channel centered at 5220 MHz could be teamed with the channel centered at 5240 MHz to support communication between an access point and one of the client devices in the service set at a higher data rate. In such a teaming arrangement, a totally new high throughput PPDU format could be developed (i.e., as opposed to the single-channel PPDU 10 of FIG. 1) that could take maximum advantage of the teamed channel for the corresponding wireless devices.

In the HT wireless network described above, the wireless client devices would have to be capable of multi-channel operation to take advantage of the teaming of channels. Mixed devices could be employed that are capable of operation within a single channel or within a teamed HT channel. It may also be desirable to allow single-channel legacy devices (e.g., IEEE 802.11a devices) to be part of the same BSS as the multi-channel HT client devices (i.e., to allow backward compatibility). This could create a problem, however, in that the legacy devices would not be able to read the PPDUs having the new HT format. The legacy devices would, therefore, not be able to set their internal NAV and remain quiet during multi-channel transmissions in the service set. In accordance with one aspect of the present invention, a mixed PPDU format is provided that will allow legacy devices to perform a NAV-type function even when a multi-channel signal has been transmitted.

Figure 2:
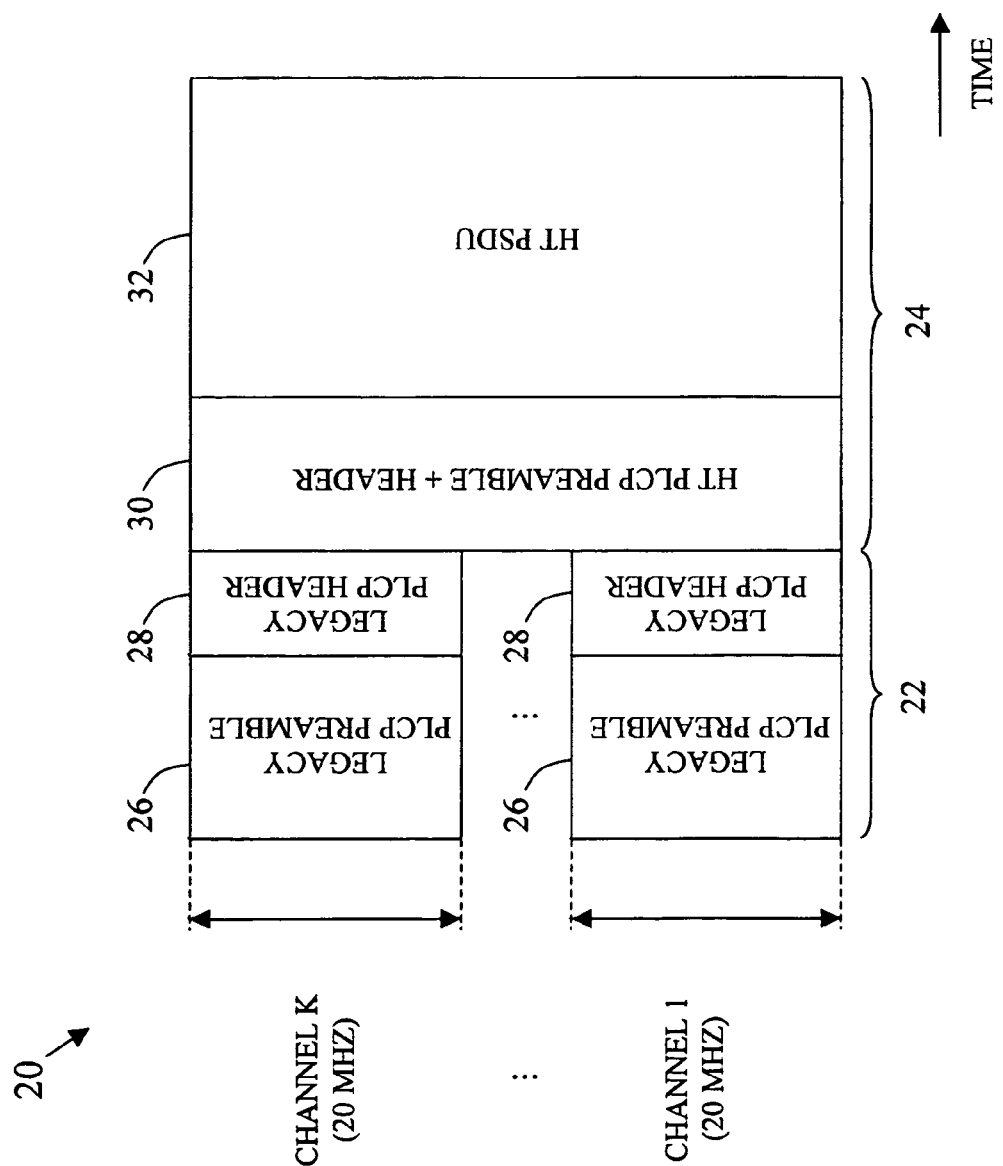
FIG. 2 is a diagram illustrating an example mixed PPDU that teams adjacent frequency channels to form an HT channel in accordance with an embodiment of the present invention.

FIG. 2 is a diagram illustrating an example mixed PPDU 20 in accordance with an embodiment of the present invention. As illustrated, the mixed PPDU 20 includes a first portion 22 and a second portion 24. The first portion 22 of the mixed PPDU 20 is readable by legacy wireless devices as well as by mixed devices. The second portion 24 of the mixed PPDU 20, however, is readable only by the mixed devices and not by the legacy devices. That is, the second portion 24 includes information that is coded across multiple frequency channels in a manner that is not be readable by a single-channel legacy device. As shown, in at least one embodiment, the first portion 22 of the PPDU 20 may include a separate legacy PLCP preamble 26 and a separate legacy PLCP header 28 within each frequency channel spanned by the second portion 24 of the PPDU 20. The legacy PLCP preamble 26 and the legacy PLCP header 28 within a particular channel may be similar to those described previously in connection with FIG. 1 (although certain additions and/or modifications may be made, as will be described in greater detail). The second portion 24 of the PPDU 20 may include a high throughput (HT) PLCP preamble and header 30 that is coded across multiple (i.e., two or more) frequency channels. The second portion 24 of the PPDU 20 may also include an HT PSDU 32 that is coded across multiple frequency channels.

During network operation, a legacy device that is operating within, for example, channel 1 of FIG. 2, may listen to the channel as part of a CCA process. If the PPDU 20 were transmitted during this time, the legacy device would sense the legacy PLCP preamble 26 and the legacy PLCP header 28 of the PPDU 20. The legacy device may synchronize to the transmitting device during the legacy PLCP preamble 26 and then read, for example, the rate and length information (among other things) from the legacy PLCP header 28 within channel 1. The legacy device may then predict the duration of the PPDU 20 using the rate and length information and set a PHY layer NAV based thereon. The legacy device would thereafter remain quiet for the corresponding duration. In at least one embodiment, the legacy PLCP header 28 will include information that may be used to predict the duration of an entire packet exchange that is currently taking place (e.g., a present data packet and a subsequent ACK packet, etc.) so that the legacy device may remain quiet for the entire exchange. Other forms of duration-related information may also (or alternatively) be included in the legacy PLCP header 28. For example, a packet duration value may be included that does not require a prediction to be made.

The legacy PLCP preamble 26 that is transmitted within a single channel may include, as before, training information that will allow a receiving device to synchronize to a corresponding transmitting device. In one possible approach, the same legacy PLCP preamble 26 is transmitted within each of the frequency channels used by the second portion 24 of the PPDU 20. In another approach, some form of weighting may be used to weight the legacy PLCP preambles 26 across the various channels (e.g., transmit power weighting, etc.). This may be done, for example, to improve preamble detection by mixed devices.

The legacy PLCP header 28 may differ in some ways from the PLCP header 14 discussed previously. For example, in at least one embodiment, the legacy PLCP header 28 will include information that is indicative of whether the corresponding PPDU 20 is a legacy PPDU or a mixed PPDU. The legacy PLCP header 28 may also include rate and length information (as read by legacy devices), where the rate is indicative of the data rate that is used in the remainder of the PPDU 20 (and may also indicate a corresponding modulation type and/or coding rate) and the length is indicative of the data length of the remainder of the PPDU 20, the data length of the PPDU 20 and a subsequent ACK packet, or some other length. The rate and length information may allow a wireless device to predict a corresponding duration for use in a PHY layer NAV. In other embodiments, a duration value may be specified within a legacy PLCP header 28 that does not require a prediction to be made. The legacy PLCP header 28 may also include an indication of whether there is an HT PLCP preamble and header 30 within the second portion 24 of the PPDU 20. In addition, the legacy PLCP header 28 may also include information indicating a type of additional HT training that is included in the HT PLCP preamble and header 30 (if any), an indication of the number of frequency channels used by the HT PSDU 32, the rate and type of HT modulation used in the HT PSDU 32, and/or the duration of the PPDU 20 as read by mixed devices. Some or all of this information may alternatively be included within the HT PLCP preamble and header 30. Other information may also be present within the legacy PLCP header 28.

The HT PLCP preamble and header 30 is an optional field within the second portion 24 of the PPDU 20. In at least one embodiment, the HT PLCP preamble and header 30 may include additional high throughput training that can be used to train a receiving device to accurately read the subsequent HT PSDU 32. This additional channel training may be made optional based on channel conditions. The legacy PLCP preambles 26 only typically provide channel training for disjoint frequency channels (e.g., 20 MHz channels in the illustrated embodiment) having "holes" therebetween (corresponding to guard bands). It is possible to train a multi-channel arrangement across these holes by using channel interpolation. However, in some instances, a greater level of accuracy may be desired. In such cases, additional HT training may be warranted. The HT PLCP preamble and header 30 may also, or alternatively, include information about the rate and modulation of the HT PSDU 32. In at least one embodiment, the transmitting device will determine the optimal HT modulation for use in the PPDU 20 based on actual, estimated, or predicted channel conditions. The HT PLCP preamble and header 30 may also, or alternatively, include information that is indicative of whether the HT PPDU 32 is transmitter trained or not.

Figure 3:
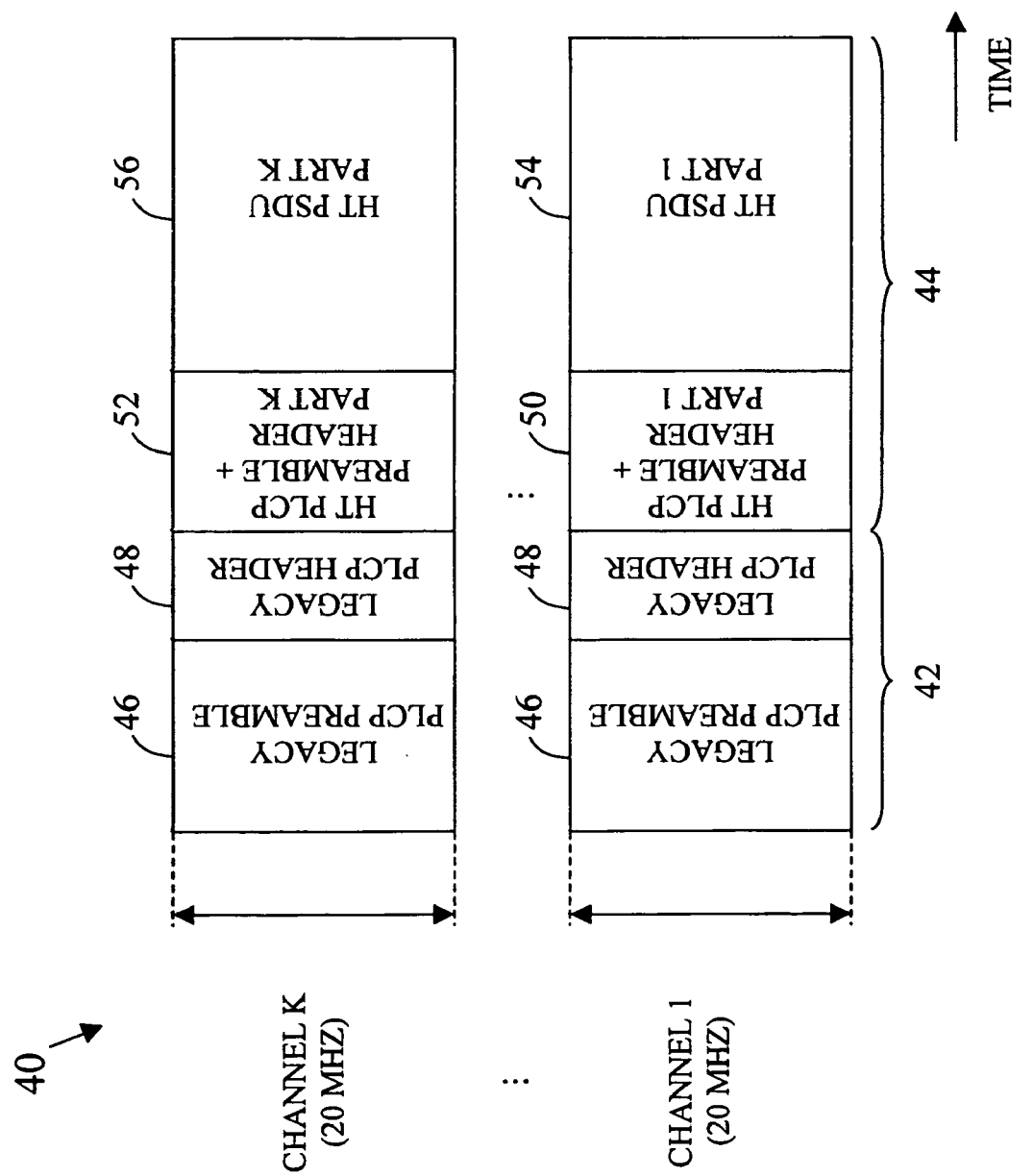
FIG. 3 is a diagram illustrating an example mixed PPDU that teams non-adjacent frequency channels to form an HT channel in accordance with an embodiment of the present invention.

In the mixed PPDU 20 of FIG. 2, the HT PSDU 32 is coded across K contiguous frequency channels. In some other embodiments, however, mixed PPDUs are generated that include HT PSDUs that are coded across multiple non-contiguous channels. For example, FIG. 3 is a diagram illustrating an example mixed PPDU 40 that teams K non-adjacent channels to form a single HT channel in accordance with an embodiment of the present invention. As shown, the PPDU 40 includes a first portion 42 and a second portion 44. The first portion 42 may be readable by both legacy devices and mixed devices, while the second portion 44 may be readable only by mixed devices. In each of the K channels, the first portion 42 of the PPDU 40 may include a legacy PLCP preamble 46 and a legacy PLCP header 48, such as those described previously. The second portion 44 of the PPDU 40 may include a part of an HT PLCP preamble and header in each of the K frequency channels and a part of an HT PSDU in each of the K frequency channels. For example, with reference to FIG. 3, the PPDU 40 includes a first part 50 of an HT PLCP preamble and header in channel 1 and a Kth part 52 of the HT PLCP preamble and header in channel K. Similarly, the PPDU 40 includes a first part 54 of an HT PSDU in channel 1 and a Kth part 56 of the HT PSDU in channel K. The overall content of the different portions may be the same or similar to the content described previously. If more than two frequency channels are combined in a non-contiguous teaming arrangement, all of the teamed channels may be non-contiguous with all of the other teamed channels or some channels may be contiguous with other channels and some not. For example, if three channels are teamed, two of the channels may be adjacent to one another and the other channel may be non-adjacent. In such a scenario, the two adjacent channels may combine to carry a first part of an HT PSDU and the non-adjacent channel may carry a second part of the HT PSDU. Many alternative teaming arrangements are also possible.

Figure 4:
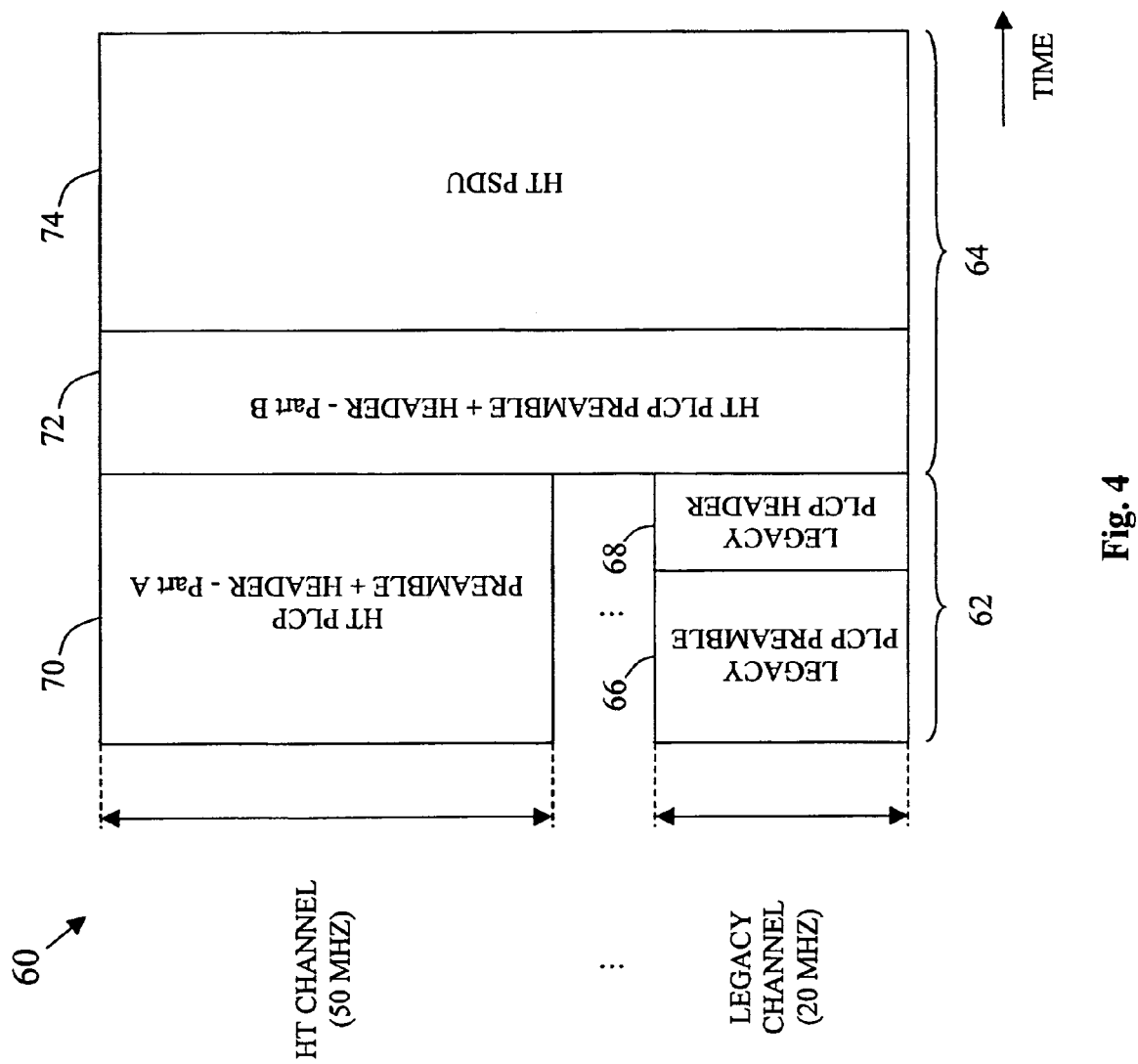
FIG. 4 is a diagram illustrating an example mixed PPDU that may be used in a network that includes pure HT client devices in accordance with an embodiment of the present invention.

In addition to legacy client devices and/or mixed client devices, a wireless network may also include pure HT client devices. These pure HT client devices may be incapable of reading the legacy PLCP preambles and/or headers described above. FIG. 4 is a diagram illustrating a mixed PPDU 60 that may be used in a network that also includes such pure HT client devices. The mixed PPDU 60 of FIG. 4 assumes that at least one dedicated HT channel (e.g., a 50 MHz channel in the illustrated embodiment) will be defined within which an HT client device may operate to the exclusion of legacy devices. As shown in FIG. 4, the mixed PPDU 60 includes a first portion 62 and a second portion 64. In the first portion 62, the mixed PPDU 60 may include a legacy PLCP preamble 66 and a legacy PLCP header 68 (such as those described previously) in each legacy channel encompassed by the second portion 64. The mixed PPDU 60 may also include a first part 70 of an HT PLCP preamble and header within the first portion 62, in a dedicated HT channel. A second part 72 of the HT PLCP preamble and header may be placed within the second portion 64 of the mixed PPDU 60. As illustrated, the second part 72 of the HT PLCP preamble and header may span a frequency range that encompasses both the HT channel (or even multiple HT channels) and one or more legacy channels. The second part 64 of the PPDU 60 may also include an HT PSDU 74 that spans the HT channel and one or more legacy channels. Other arrangements that include both HT encoded information and legacy encoded information within a first portion of a PPDU may alternatively be used.

Figure 5:
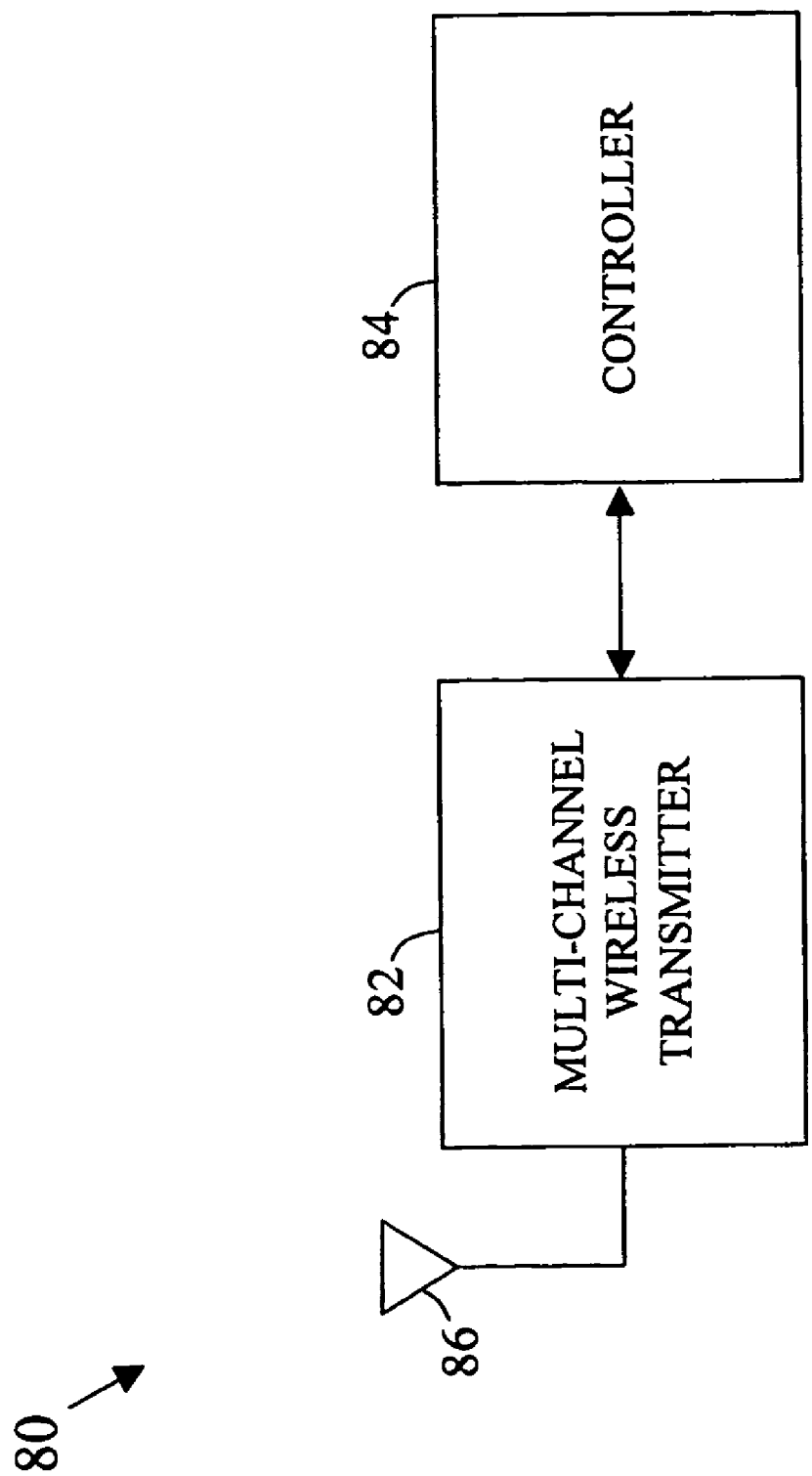
FIG. 5 is a block diagram illustrating an example wireless apparatus in accordance with an embodiment of the present invention.

FIG. 5 is a block diagram illustrating an example wireless apparatus 80 in accordance with an embodiment of the present invention. The wireless apparatus 80 may be part of, for example, a wireless client device, a wireless access point, or some other wireless device for use in a wireless network. As illustrated, the wireless apparatus 80 may include a multi-channel wireless transmitter 82 and a controller 84. The multi-channel wireless transmitter 82 is operative for transmitting wireless signals via an antenna 86. Any type of antenna may be used including, for example, a dipole, a patch, a helix, an array, and/or others, including a combination of different antennas. In at least one embodiment, multiple transmit antennas may be provided. In one possible approach, for example, multiple antennas may be used in an antenna diversity arrangement. In another possible approach, multiple antennas may be used in a device implementing multiple-input multiple-output (MIMO) techniques. For example, in at least one implementation, the multi-channel wireless transmitter 82 may transmit a different frequency channel on each of a number of different antennas. Other antenna arrangements are also possible. The controller 84 is operative for, among other things, generating data units for transmission by the multi-channel wireless transmitter 82. The wireless apparatus 80 may be operative in a wireless network environment that includes different classes of wireless client devices. For example, a first class of client devices may include single-channel legacy client devices and a second class of client devices may include mixed devices that are capable of single channel operation and teamed channel HT operation. Other client device classes may alternatively be used.

The data unit generated by the controller 84 and transmitted by the wireless transmitter 82 may have a first portion that includes first information that is coded over a single frequency channel and a second portion that includes second information that is coded across multiple frequency channels. The first information may be readable by client devices within both the first and second classes. The second information may be readable by client devices within the second class, but not by client devices within the first class. The first portion of the data unit may include information that can be used to determine a duration associated with the data unit. In this manner, after the data unit has been transmitted, a client device within the first class can read the first portion of the data unit and determine the duration associated with the client device and then remain quiet for the determined duration to avoid the creation of collisions in the network. The duration that is determined may include, for example, a duration of the data unit itself, an anticipated duration of a packet exchange that involves the data unit, etc. In at least one embodiment, the wireless apparatus 80 may transmit one or more of: the PPDU 20 of FIG. 2, the PPDU 40 of FIG. 3, and the PPDU 60 of FIG. 4. Other data unit formats may alternatively be transmitted.

In at least one embodiment of the present invention, a MIMO-enabled wireless device is provided that is capable of transmitting mixed data units, such as the mixed PPDUs of FIGS. 2, 3, and 4. When the MIMO device is in a network with a MIMO-based AP, the device may operate in a MIMO mode in which all transmit antennas in the device will transmit in a single channel with special MIMO signaling. When the MIMO device is in a network with an AP that is configured for channel teaming, the device may operate in an channel teaming mode that associates different frequency channels with different antennas. For example, in one possible approach, each transmit antenna may transmit on a different single frequency channel. One or more of the transmit antennas may transmit within a teamed channel. In addition, multiple transmit antennas may transmit within the same single channel or teamed channel. By using an adaptive approach in a MIMO device, it may be possible to tailor, for example, the power amplifiers at the transmit antennas and the analog-to-digital converters at the receive antennas for use within a specific single channel or teamed channel. Tuning different transmit and receive antennas to different center frequencies may permit operation in a channel teaming mode without requiring the addition of more expensive hardware.

Figure 6:
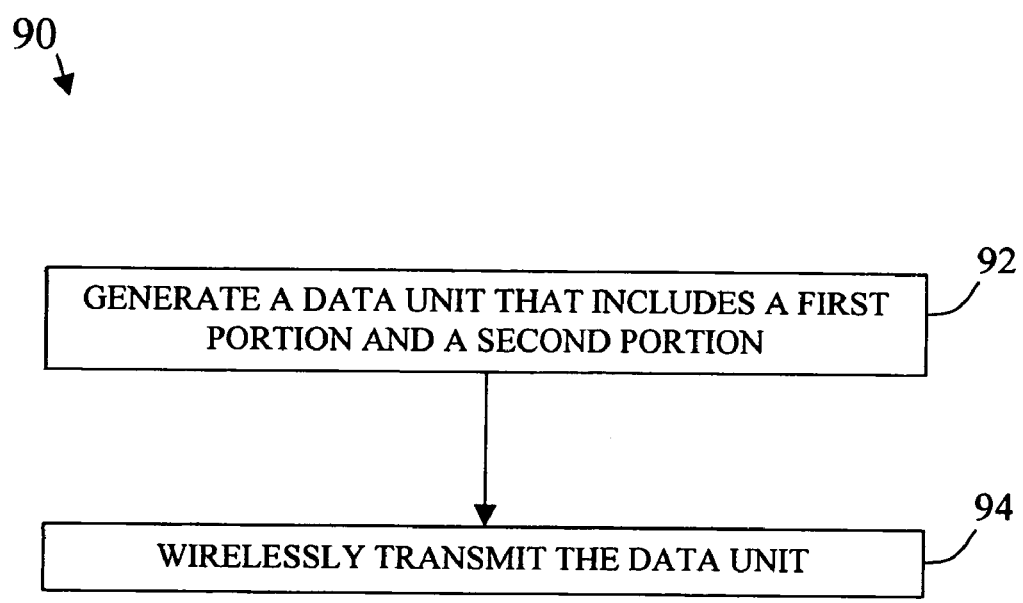
FIG. 6 is a flowchart illustrating an example method for use in transmitting data in a wireless network in accordance with an embodiment of the present invention.

FIG. 6 is a flowchart illustrating an example method 90 for use in transmitting data in a wireless network in accordance with an embodiment of the present invention. A data unit is first generated that includes a first portion and a second portion (block 92). The data unit is then wirelessly transmitted (block 94). The first portion of the data unit includes first information that is coded over a single frequency channel. The second portion of the data unit includes second information that is coded across multiple frequency channels. The first information may be readable by both legacy devices and mixed devices and the second information may be readable by mixed devices, but not by legacy devices. In at least one embodiment, the first portion of the data unit includes information that may be used to determine a duration associated with the data unit. This may allow a legacy device to read the first portion, determine the duration, and then remain quiet for the specified period. In a network following IEEE 802.11, the legacy device may, for example, set a physical layer NAV using the determined duration information. In networks following other wireless networking standards, other mechanisms may be used. In at least one implementation of the method 90, one or more of: the PPDU 20 of FIG. 2, the PPDU 40 of FIG. 3, and PPDU 60 of FIG. 4 may be transmitted. Other data unit formats may alternatively be used. In at least one embodiment of the present invention, the data unit is wirelessly transmitted using multiple transmit antennas. In a MIMO related approach, for example, a different frequency channel may be transmitted from each antenna in a plurality of transmit antennas.

Figure 7:
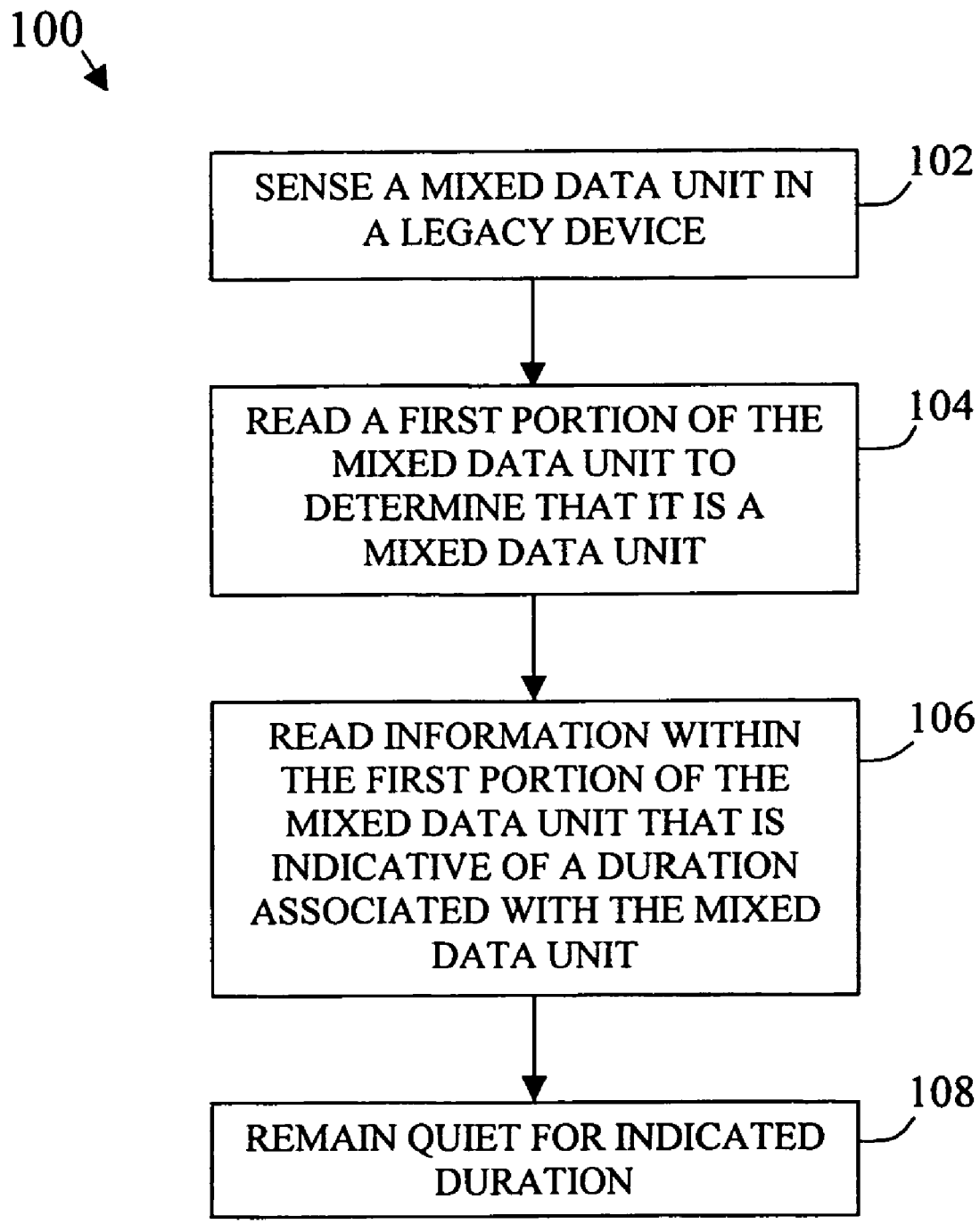
FIG. 7 is a flowchart illustrating an example method for use in avoiding collisions in a wireless network in accordance with an embodiment of the present invention.

FIG. 7 is a flowchart illustrating an example method 100 for use in avoiding a collision in a wireless network in accordance with an embodiment of the present invention. A legacy client device that is operative within a single frequency channel senses a mixed data unit that has been wirelessly transmitted in a vicinity thereof (block 102). The legacy device reads a first portion of the mixed data unit to determine that it is a mixed data unit (block 104). The legacy device also reads information from the first portion of the mixed data unit that allows the legacy device to determine a duration associated with the mixed data unit (block 106). The duration may be the duration of the mixed data unit, the duration of a portion of the mixed data unit, the duration of a packet exchange involving the mixed data unit, or some other duration. The legacy device may then remain quiet for the indicated duration so that collisions may be avoided within the wireless medium (block 108). In an IEEE 802.11a based client device, the device may set, for example, a physical layer network allocation vector (NAV) using the duration information. Other techniques may alternatively be used.

Although the invention has been described herein, for the most part, in the context of networks following the IEEE 802.11 wireless networking standard and its progeny, it should be appreciated that the inventive concepts may also be utilized in systems following other wireless networking standards.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method for use in a wireless network, comprising:
    generating a data unit; and
    wirelessly transmitting said data unit;
    wherein a first portion of said transmitted data unit includes first information that is coded over a single frequency channel and a second portion of said transmitted data unit includes second information that is coded across multiple frequency channels;
    wherein: said first information in said first portion of said transmitted data unit can be read by wireless client devices within a first class and wireless client devices within a second class; and said second information in said second portion of said transmitted data unit can be read by wireless client devices within said second class, but not by wireless client devices within said first class;

wherein: said first information in said first portion of said transmitted data unit includes duration related information that can be used by a wireless client device within said first class to determine a duration for which said wireless client device is to remain quiet to avoid collision.

2. The method of claim 1, wherein:
said first portion of said transmitted data unit further includes third information that is coded over a single frequency channel, wherein said third information is coded over a different frequency channel than said first information.

3. The method of claim 1, wherein:
said wireless client devices within said first class are wireless devices that operate in a single frequency channel at a time.

4. The method of claim 1, wherein:
said wireless client devices within said first class include wireless devices that follow at least one of the following wireless networking standards: IEEE 802.11a, IEEE 802.11b, IEEE 802.11g, and IEEE 802.11h.

5. The method of claim 1, wherein:
said first information in said first portion of said transmitted data unit includes duration related information that can be used by a wireless client device within said first class to determine a duration for which said wireless client device is to remain quiet to avoid collision.

6. The method of claim 1, wherein:
said transmitted data unit is a mixed physical layer convergence protocol (PLCP) protocol data unit (PPDU); and
said first portion of said mixed PPDU includes a first PLCP header that is coded over a single frequency channel.

7. The method of claim 6, wherein:
said second portion of said mixed PPDU includes a high throughput PLCP service data unit (PSDU) that is coded across multiple frequency channels.

8. The method of claim 7, wherein:
said multiple frequency channels are contiguous.

9. The method of claim 7, wherein:
said multiple frequency channels are not contiguous.

10. The method of claim 6, wherein:
said first portion of said mixed PPDU further includes a second PLCP header that is also coded over a single frequency channel, wherein said second PLCP header is coded over a different frequency channel than said first PLCP header.

11. The method of claim 6, wherein:
said first portion of said mixed PPDU further includes a first PLCP preamble that is coded across a single frequency channel, said first PLCP preamble being coded across the same frequency channel as said first PLCP header.

12. The method of claim 6, wherein:
said first PLCP header includes data rate information and length information associated with said mixed PPDU.

13. The method of claim 6, wherein:
said first PLCP header includes information indicating that said data unit is a mixed PPDU.

14. The method of claim 6, wherein:
said first PLCP header includes information indicating a type of high throughput training data in said second portion of said mixed PPDU.

15. The method of claim 6, wherein:
said first PLCP header includes information indicating the number of frequency channels that said second information in said second portion of said mixed PPDU is coded across.

16. The method of claim 6, wherein:
said first PLCP header includes information indicating whether said second portion of said mixed PPDU includes a high throughput PLCP preamble and header.

17. The method of claim 6, wherein:
said first PLCP header includes information indicating a type of high throughput modulation used in a high throughput PSDU in said second portion of said mixed PPDU.

18. The method of claim 6, wherein:
said first PLCP header includes information indicating a high throughput data rate used in a high throughput PSDU in said second portion of said mixed PPDU.

19. The method of claim 6, wherein:
said first PLCP header includes information related to a duration associated with said mixed PPDU.

20. The method of claim 6, wherein:
said second portion of said mixed PPDU includes a high throughput PLCP preamble and header that is coded across multiple frequency channels.

21. The method of claim 20, wherein:
said high throughput PLCP preamble and header includes information indicating a type of high throughput training data in said second portion of said mixed PPDU.

22. The method of claim 20, wherein:
said high throughput PLCP preamble and header includes high throughput training data.

23. The method of claim 20, wherein:
said high throughput PLCP preamble and header includes information indicating a type of high throughput modulation used in a high throughput PSDU in said second portion of said mixed PPDU.

24. The method of claim 20, wherein:
said high throughput PLCP preamble and header includes duration related information associated with said mixed PPDU.

25. The method of claim 1, wherein:
said first portion of said transmitted data unit further includes fourth information that is coded across multiple frequency channels, wherein said fourth information is coded across fewer frequency channels than said second information in said second portion of said transmitted data unit.

26. The method of claim 25, wherein:
said data unit is a mixed physical layer convergence protocol (PLCP) protocol data unit (PPDU); and
said fourth information includes at least a part of a high throughput PLCP preamble and header.

27. The method of claim 1, wherein:
wirelessly transmitting said data unit includes transmitting said data unit using multiple transmit antennas.

28. The method of claim 1, wherein:
wirelessly transmitting said data unit includes transmitting said data unit using a different transmit antenna for each frequency channel transmitted.

29. An apparatus comprising:
a controller to generate a data unit; and
a multi-channel wireless transmitter to transmit said data unit;
wherein a first portion of said transmitted data unit includes first information that is coded over a single frequency channel and a second portion of said transmitted data unit includes second information that is coded across multiple frequency channels;

wherein: said first information in said first portion of said transmitted data unit can be read by wireless client devices within a first class and wireless client devices within a second class; and said second information in said second portion of said transmitted data unit can be read by wireless client devices within said second class, but not by wireless client devices within said first class;

wherein: said first information in said first portion of said transmitted data unit includes duration related information that can be used by a wireless client device within said first class to determine a duration for which said wireless client device is to remain quiet to avoid collision.

30. The apparatus of claim 29, wherein:
said first information in said first portion of said transmitted data unit includes duration related information that can be used by a wireless client device within said first class to determine a duration for which said wireless client device is to remain quiet to avoid collision.

31. The apparatus of claim 29, wherein:
said data unit is a mixed physical layer convergence protocol (PLCP) protocol data unit (PPDU); and
said first portion of said mixed PPDU includes a first PLCP header that is coded across a single frequency channel.

32. The apparatus of claim 31, wherein:
said second portion of said mixed PPDU includes a high throughput PLCP service data unit (PSDU) that is coded across multiple frequency channels.

33. The apparatus of claim 29, wherein:
said apparatus is part of a wireless client device.

34. The apparatus of claim 29, wherein:
said apparatus is part of a wireless access point.

35. An article comprising a storage medium having instructions stored thereon that, when executed by a computing platform, result in:
generating a data unit; and
wirelessly transmitting said data unit;
wherein a first portion of said transmitted data unit includes first information that is coded over a single frequency channel and a second portion of said transmitted data unit includes second information that is coded across multiple frequency channels;
wherein: said first information in said first portion of said transmitted data unit can be read by wireless client devices within a first class and wireless client devices within a second class; and said second information in said second portion of said transmitted data unit can be read by wireless client devices within said second class, but not by wireless client devices within said first class;
wherein: said first information in said first portion of said transmitted data unit includes duration related information that can be used by a wireless client device within said first class to determine a duration for which said wireless client device is to remain quiet to avoid collision.

36. The article of claim 38, wherein:
said first information in said first portion of said transmitted data unit includes duration related information that can be used by a wireless client device within said first class to determine a duration for which said wireless client device is to remain quiet to avoid collision.

37. The article of claim 34, wherein:
said data unit is a mixed physical layer convergence protocol (PLCP) protocol data unit (PPDU); and
said first portion of said mixed PPDU includes a first PLCP header that is coded over a single frequency channel.

38. The article of claim 37, wherein:
said second portion of said mixed PPDU includes a high throughput PLCP service data unit (PSDU) that is coded across multiple frequency channels.

39. A system comprising:
at least one dipole antenna
a controller to generate a data unit; and
a multi-channel wireless transmitter, coupled to said at least one dipole antenna, to transmit said data unit;
wherein a first portion of said transmitted data unit includes first information that is coded over a single frequency channel and a second portion of said transmitted data unit includes second information that is coded across multiple frequency channels;
wherein: said first information in said first portion of said transmitted data unit can be read by wireless client devices within a first class and wireless client devices within a second class; and said second information in said second portion of said transmitted data unit can be read by wireless client devices within said second class, but not by wireless client devices within said first class;
wherein: said first information in said first portion of said transmitted data unit includes duration related information that can be used by a wireless client device within said first class to determine a duration for which said wireless client device is to remain quiet to avoid collision.

40. The system of claim 43, wherein:
said first information in said first portion of said transmitted data unit includes duration related information that can be used by a wireless client device within said first class to determine a duration for which said wireless client device is to remain quiet to avoid collision.

41. The system of claim 39, wherein:
said data unit is a mixed physical layer convergence protocol (PLCP) protocol data unit (PPDU); and
said first portion of said mixed PPDU includes a first PLCP header that is coded across a single frequency channel.

42. The system of claim 41, wherein:
said second portion of said mixed PPDU includes a high throughput PLCP service data unit (PSDU) that is coded across multiple frequency channels.

43. The system of claim 39, wherein:
said at least one dipole antenna is part of an antenna diversity arrangement.

44. The system of claim 39, wherein:
said at least one dipole antenna is part of a plurality of transmit antennas, wherein said multi-channel wireless transmitter transmits a first frequency channel using a first antenna within said plurality of transmit antennas and a second frequency channel using a second antenna within said plurality of transmit antennas.

45. A wireless signal comprising:
a first portion having first information that is coded over a single frequency channel; and
a second portion having second information that is coded across multiple frequency channels;
wherein: said first information in said first portion can be read by wireless client devices within a first class and wireless client devices within a second class; and said second information in said second portion can be read by wireless client devices within said second class, but not by wireless client devices within said first class;

wherein: said first portion includes duration related information that can be used by a wireless client device within said first class to determine a duration for which said wireless client device is to remain quiet to avoid collision.

46. The wireless signal of claim 45, wherein:

said first portion includes duration related information that can be used by a wireless client device within said first class to determine a duration for which said wireless client device is to remain quiet to avoid collision.

47. The wireless signal of claim 45, wherein:

said first portion further includes third information that is also coded over a single frequency channel, wherein said third information is coded over a different frequency channel than said first information.

48. The wireless signal of claim 45, wherein:

said first portion further includes fourth information that is coded across multiple frequency channels, wherein said fourth information is coded across fewer frequency channels than said second information in said second portion.

49. The wireless signal of claim 48, wherein:

said wireless signal is a mixed physical layer convergence protocol (PLCP) protocol data unit (PPDU); and said fourth information includes at least a part of a high throughput PLCP preamble and header.

50. The wireless signal of claim 45, wherein:

said wireless signal is a mixed physical layer convergence protocol (PLCP) protocol data unit (PPDU); and said first portion of said mixed PPDU includes a first PLCP header that is coded across a single frequency channel.

51. The wireless signal of claim 50, wherein:

said second portion of said mixed PPDU includes a high throughput PLCP service data unit (PSDU) that is coded across multiple frequency channels.

52. A method for avoiding a collision in a wireless network comprising:

sensing a transmitted data unit within a first wireless client device that is operative within a single frequency channel;

reading a first portion of the transmitted data unit to determine that the transmitted data unit is a mixed data unit that includes a second portion that is coded across multiple frequency channels and that cannot be read by the first wireless client device;

reading duration related information from the first portion of the transmitted data unit to determine a duration for which the first wireless client device is to remain quiet; and remaining quiet for the indicated duration.

53. The method of claim 52, wherein:

said first portion of said transmitted data unit includes information that is coded over a single frequency channel.

54. The method of claim 52, wherein:

said duration related information includes information from which a duration of the transmitted data unit can be predicted.

55. The method of claim 52, wherein:

said duration related information includes information from which a duration of a packet exchange involving the transmitted data unit can be predicted.

56. The method of claim 52, wherein:

said duration related information includes a duration of the transmitted data unit.

* * * * *